United States Patent [19]

Dally et al.

[11] Patent Number: 5,212,778
[45] Date of Patent: May 18, 1993

[54] MESSAGE-DRIVEN PROCESSOR IN A CONCURRENT COMPUTER

[75] Inventors: William J. Dally, Framingham, Mass.; Andrew A. Chien, Urbana; Waldemar P. Horwat, Hoffman Estates, both of Ill.; Stuart Fiske, Montreal, Canada

[73] Assignee: Massachusetts Institute of Technology, Cambridge, Mass.

[21] Appl. No.: 200,003

[22] Filed: May 27, 1988

[51] Int. Cl.⁵ .................... G06F 15/16; G06F 9/32; G06F 12/06; G06F 13/00

[52] U.S. Cl. .................... 395/400; 395/250; 395/425; 395/800; 395/650; 395/375; 395/200; 364/DIG. 1; 364/228.7; 364/228.9; 364/229; 364/229.1; 364/238.6; 364/239; 364/239.4; 364/244.3; 364/244.4; 364/254; 364/254.2; 364/255.2; 364/255.5; 364/260; 364/284; 364/284.1; 364/284.3

[58] Field of Search .............. 364/200 MS, 900 MS; 395/200, 250, 375, 400, 425, 650, 800; 370/60

[56] References Cited

U.S. PATENT DOCUMENTS

| | | | |
|---|---|---|---|
| 4,131,940 | 12/1978 | Moyer | 364/200 |
| 4,270,167 | 5/1981 | Koehler et al. | 364/200 |
| 4,325,120 | 4/1982 | Colley et al. | 364/200 |
| 4,333,144 | 6/1982 | Whiteside et al. | 364/200 |
| 4,374,409 | 2/1983 | Bienvenu et al. | 364/200 |
| 4,381,541 | 4/1983 | Baumann, Jr. et al. | 364/200 |
| 4,387,427 | 6/1983 | Cox et al. | 364/200 |
| 4,635,254 | 1/1987 | Tulpule et al. | 370/85 |
| 4,769,768 | 9/1988 | Bomba et al. | 364/200 |
| 4,814,973 | 3/1989 | Hillis | 364/200 |
| 4,814,978 | 3/1989 | Dennis | 364/900 X |
| 4,814,980 | 3/1989 | Peterson et al. | 364/200 |

OTHER PUBLICATIONS

William J. Dally, "A VLSI Architecture for Concurrent Data Structures", Kluwer Academic Publishers, 1987, pp. 183–191.

IBM Technical Disclosure Bulletin, vol. No. 2, Jul. 1977, pp. 871–872.

William J. Dally, "A VLSI architecture for concurrent data structures", thesis, California Institute of Technology, Mar. 3, 1986, 215 pp.

*Primary Examiner*—Paul V. Kulik
*Attorney, Agent, or Firm*—Hamilton, Brook, Smith & Reynolds

[57] ABSTRACT

A message-driven concurrent computer system stores incoming messages in a row buffer and then in a queue in main memory. A translator cache is also located in main memory, and output from the cache is through a set of comparators. Both the queue and cache are addressed in a wraparound fashion by hardware. An instruction buffer holds an entire row of instructions from memory. Translate, suspend and send instructions are available to the user. Tags provide for synchronization when objects are retrieved from remote processors and identify addresses as being physical addresses of a local processor or a node address of a remote processor.

5 Claims, 5 Drawing Sheets

MESSAGE-DRIVEN PROCESSOR IN A CONCURRENT COMPUTER

The Government has rights in this invention pursuant to grants Number N00014-80-C-0622 and N00014-85-K-0124 awarded by the Department of the Navy.

MICROFICHE APPENDIX

A computer program listing is included in a microfiche appendix having one microfiche including 52 frames. The listing is for a simulation of the message-driven processor of the present invention.

RELATED PUBLICATIONS

Details of the present invention are presented in the following publications:

Dally et al., "Architecture of a Message-Driven Processor," Proceedings of the 14th Annual Symposium on Computer Architecture, The Computer Society of the IEEE, Jun. 2-5, 1987.

Totty, "An Operating Environment for the Jellybean Machine," Thesis, Department of Electrical Engineering and Computer Science, Massachusetts Institute of Technology, May 6, 1988. The operating system which may be used in a system embodying the invention is presented in the Totty thesis.

Dally et al., "Fine-grain Message-passing Concurrent Computers," ACM Third Conference on Hypercube Concurrent Computers and Applications. Jan. 1988.

BACKGROUND OF THE INVENTION

Conventional computer systems utilize a von Neumann organization in which a single instruction stream is applied to a single processor to operate on a single data stream. In such systems, the performance is closely coupled to the performance of the single processor. In parallel systems, on the other hand, an array of processors operates in parallel on multiple data streams. Performance of the system can be increased as a function of the number of processors in the array as well as the performance of individual processors.

Parallel architectures generally fall into two categories: single instruction, multiple data (SIMD) and multiple instruction, multiple data (MIMD). In SIMD systems, a single instruction stream is broadcast to all processors of the array, and all processors simultaneously perform the same operations but on different sets of data. In MIMD systems, each processor is provided with its own instruction set so that different instructions can be applied to different sets of data in parallel.

One form of MIMD relies on message-driven processors. One form of message-driven processor in such a processor array was presented by William Dally in "A VLSI Architecture for Concurrent Data Structures," PhD Thesis, Department of Computer Science, California Institute of Technology, Technical Report 5209: TR 86, 1986 and in *A VLSI Architecture for Concurrent Data Structures,* 1987. In that system, messages are transferred between processors of the array to drive the individual processors. Within each processor, the messages are buffered in a queue. Once the message is transferred from the queue to a receive buffer, it is interpreted to look up a method specified by a selector and class in the message. Sequential messages identify sequential methods for processing. Each processor need not retain a complete set of methods. Rather, as methods are referenced, they can be copied over the network.

DISCLOSURE OF THE INVENTION

The present invention has particular application to message-driven MIMD systems, but certain features can be extended to other parallel processors and even to single processor systems.

In accordance with one aspect of the invention, sequential messages are stored in a queue. With suspension of a routine, the header of a message in queue is read to provide a physical address in the processor memory; the physical address is that of a first routine to be processed. The memory queue provides a memory segment with additional message data, and the initial instruction to which the header points establishes a new thread of control with each message.

Preferably, sequential messages are automatically stored in the queue independent of any ongoing routine, and scheduling of messages and thus routines is determined by the order in which messages are received, although priorities may be established. Preferably, the queue is in a predefined space in the main memory in which both instructions and data are stored. Queue addressing circuitry automatically addresses the main memory with receipt of incoming message words. The address circuitry provides for automatic wraparound of messages from the end of the queue memory space to the base of the queue memory space.

The address in the queue with wraparound may be provided by the logical combination of an address without wraparound, a mask value which defines the length of the queue in memory space and a base value which defines the base of the queue in memory space. The mask value selects, for an address with wraparound, the upper bits on the base value and the lower bits from the address without wraparound. To that end, the length of the queue is the mask value plus one and is a value $2^x$ and the base is a value $k2^x$ where k and x are integers. In a very simple queue addressing circuit, the logical combination is by means of an AND gate which receives the address without wraparound and the mask value as inputs, and an OR gate which receives the output of the AND gate and the base value as inputs.

To minimize memory accesses in writing messages into queue and allow continued accesses by the local processor, a queue row buffer is provided to receive plural words from a communication channel to be written as a full row in one access into memory. The queue row buffer is coupled in parallel with the conventional multiplexer which forwards individual words from an addressed row to a data bus.

To facilitate the dispatch of new messages, each routine resulting from a message ends in a SUSPEND machine instruction which removes the current message from the queue and initiates processing of a routine designated by the next message in the queue.

Preferably, the data structure includes a tag associated with each data word. A flag may be set to indicate that the associated data is not valid. Thus, a local processor may process a routine which sets the value of variable data with reference to data retained by a remote processor. As a request is forwarded to the remote processor, the flag is set to indicate that the variable data is not valid. Processing at the local processor may then continue until the value of the variable data is required. Further processing is then withheld until the proper value of the data is obtained and the flag is reset.

A tag may also be associated with object identifier data to indicate location of an object in a local processor or in a remote processor. That identifier may then be translated to a local address where the tag indicates location in a local processor or to a remote processor node address where the tag indicates location in a remote processor. Where the translation is to a remote processor node address, the other node may be one indicated by a prior routine to have access to the object, or it may be indicated as a hometown node from a field of the identifier.

To provide flexibility to the programmer in rapidly performing translations, the processing unit responds to ENTER and XLATE (translate) instructions and the keys provided by the instructions. With each instruction, memory is addressed at a location associated with the key. With the ENTER instruction, data corresponding to the key is entered into memory for later recall by the XLATE instruction. The ENTER and XLATE instructions are readily available to the user for different types of translations. Thus, a routine may include an ENTER instruction to enter a physical address as data associated with an identification key (virtual address) and may include another ENTER instruction to enter a method identifier as data associated with a function selector and data class.

To further increase the speed of most translations, the translator may include a set-associative cache established in main memory. To that end, each key addresses plural pairs of words in a predefined translator space, and data is written with the key into memory with the ENTER instruction. With the XLATE instruction, the key is read from memory with the data. Comparators are provided for comparing the key in a translation instruction with keys read from memory to select the data associated with a matching key from memory. Preferably, hashing of the key provides for wraparound within a predefined memory space. Wraparound results from a logical combination of the key with a base value and a mask value in an approach like that used in queue wraparound.

To increase the bandwidth of the memory in retrieving instructions, an instruction row buffer may be provided to store a row of instruction words to be applied as instructions to the processor. The instruction row buffer is coupled in parallel with the multiplexer which forwards individual words from addressed rows to a data bus and in parallel with the queue row buffer.

Transmission of messages to remote processors is facilitated by a set of SEND instructions. Once transmission of a message begins, processing of that message by the processor continues until an end SENDE instruction is processed. As a result, it is not possible for higher priority incoming messages which might require the results of the outgoing message to interfere with the outgoing message. Locking out when transferring messages to the network and rate matching is facilitated by a buffer which receives a sequence of words of the message. The message is transferred through the network with receipt of the SENDE instruction or a full buffer. When the transmission begins due to a full buffer, the processor continues to place words of the message in the buffer until the SENDE instruction is processed.

DESCRIPTION OF A PREFERRED EMBODIMENT

Figure 1:
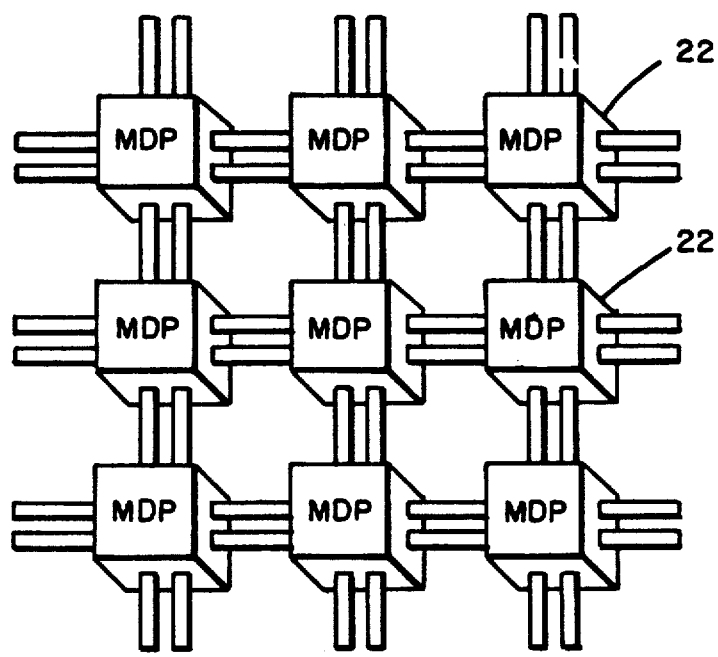
FIG. 1 is a schematic illustration of an array of message-driven processors embodying the present invention.

A concurrent computer system embodying the present invention is illustrated in FIG. 1. The system comprises an array of message-driven processors (MDP) 22. Only a 3×3 array is illustrated, but the array would more likely be on the order of a 32×32 processor array. The processing elements have small, local memories and are connected in a loosely coupled network. Internode communication is provided by message SENDs that are automatically routed to the proper destination nodes. A suitable communications controller is described in Dally et al., "Design of a Self-timed VLSI Multicomputer Communication Controller," Proceedings of the IEEE International Conference on Computer Design: VLSI in Computers and Processors, Oct. 5, 1987.

Figure 2:
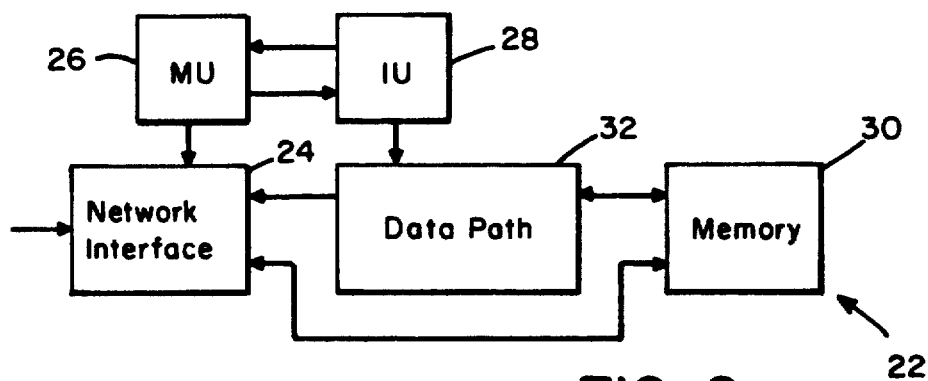
FIG. 2 is a block diagram of one of the message-driven processors of FIG. 1.

FIG. 2 shows a block diagram of an MDP 22. Messages arrive at the network interface 24. The message unit (MU) 26 controls the reception of these messages, and depending on the status of the instruction unit (IU) 28, either signals the IU to begin execution, or buffers the message in memory 30. The IU executes methods by controlling the registers and arithmetic units in the data path 32, and by performing read, write, and translate operations on the memory. While the MU and IU are conceptually separate units, in the current implementation they are combined into a single controller.

Figure 3:
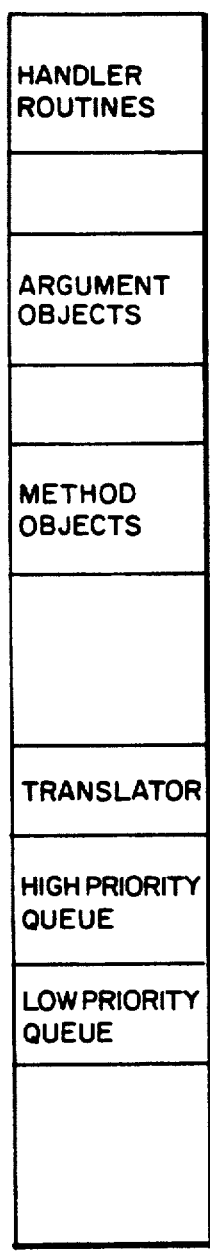
FIG. 3 is a schematic illustration of data stored in the memory of the processor of FIG. 2.

As illustrated in FIG. 3, a single address space in main local memory 30 supports several tools of the system. As messages are received, they are automatically placed in a low priority or high priority queue under control of the message unit 26. Messages are selected for processing on a first-in-first-out basis first from the high priority queue and then from the low priority queue. Addressing of the queue is through hardware which provides prompt prioritized first-in-first-out scheduling. The memory also includes a set of handler routines, generally stored in ROM, for initially handling messages received by the MDP. As discussed below, those routines are directly addressed by code which presents the physical address of the handler routine in a header of the incoming message. Thus, no routine need be running to dispatch the routine of each message. Rather, dispatch is automatic with reading of the header by hardware.

Objects, including arguments and methods, are written into memory in response to incoming messages and are later addressed by messages to process data. Finally, a segment of memory is designated as a translator space as will be discussed in detail below. This space serves as a cache available to the programmer through machine instructions for providing any translation and is used by the system for identifying objects from class and selector data and for locating objects from virtual addresses.

Figure 4:
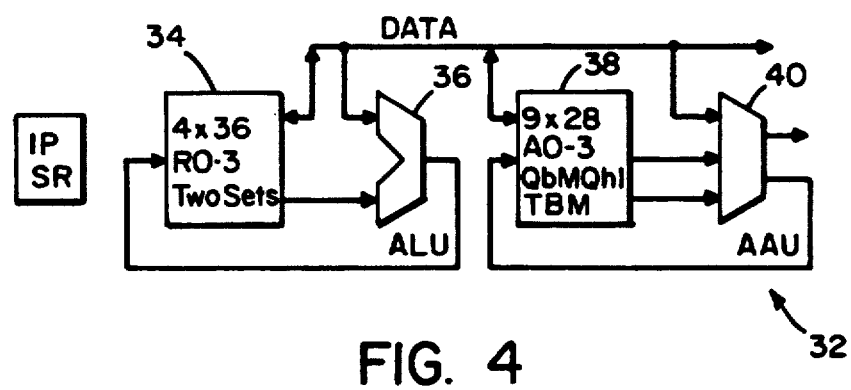
FIG. 4 is a block diagram of the data path of the processor of FIG. 2.

As shown in FIG. 4, the data path 32 is divided into two sections. The arithmetic section includes two copies of general registers 34, and an arithmetic unit (ALU) 36. The ALU unit accepts one argument from the register file, one argument from the data bus, and returns its result to the register file.

The address section includes address, queue, IP, and TBM registers 38 and an address unit (AAU) 40. The AAU generates memory addresses, and may modify the contents of a queue register. In a single cycle it can (1) perform a queue insert or delete (with wraparound), (2) insert portions of a key into a base field to perform a translate operation, (3) compute an address as an offset from an address register's base field and check the address against the limit field, or (4) fetch an instruction word and increment the corresponding IP.

Figure 5:
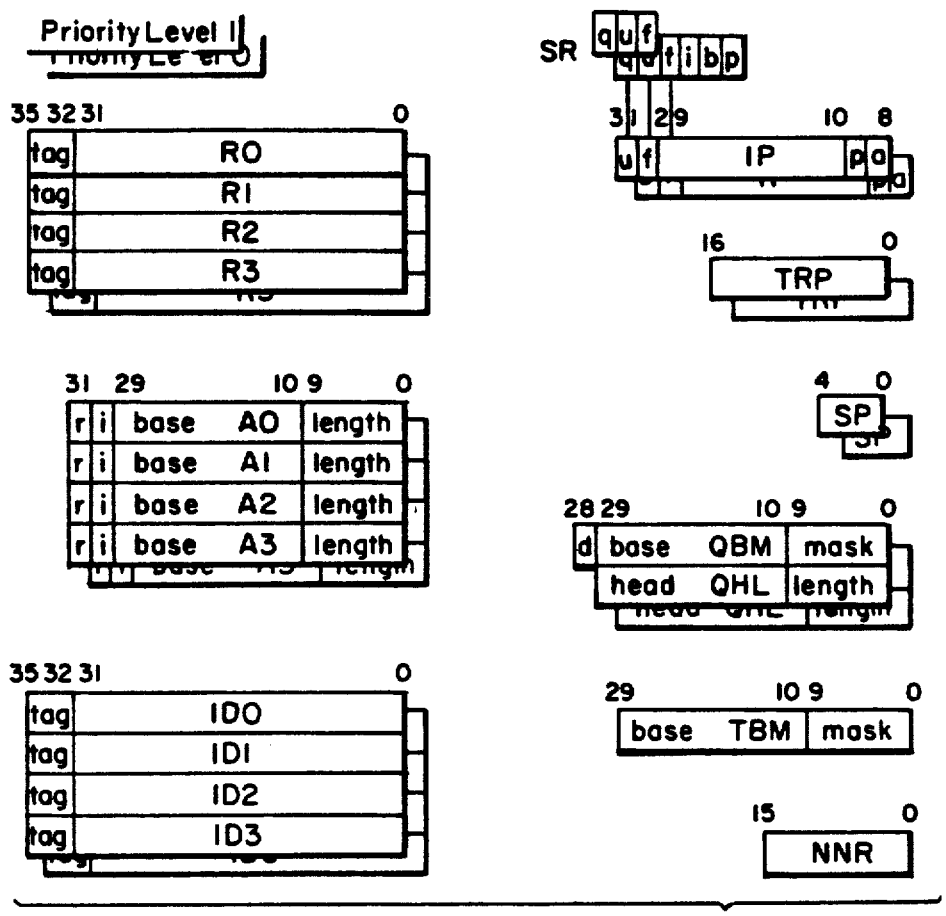
FIG. 5 is an illustration of the registers in the processor of FIG. 2.

There are two independent copies of most registers for each of the two priorities of the MDP, allowing easy priority switches while keeping the integrity of the registers. The registers, illustrated in FIG. 5, are symbolically represented as follows:

R0-R3 general-purpose data registers
A0-A3 address registers
ID0-ID3 registers
SR status register
IP instruction pointer register
TRP trapped instruction register
SP stack pointer register
QBM queue base/limit register
QHL queue head/tail register
TBM translation base/mask register
NNR node number register Four 36-bit general-purpose data registers. R0-R3, are capable of storing any word and tag. They are used for all data manipulation operations; as such, they are the most accessible registers in the programming model.

The address registers, A0-A3, are used for memory references, both data and instruction fetch. Each address register consists of a pair of integers and two bits. The integers represent the base and the length of an object in memory. The base points to the first memory location occupied by the object, while the length specifies the length of the object. The length field is used to support limit checking to insure that a reference lies within the bounds of the address register. A zero length specifies that no limit checking should be performed on accesses through the register, effectively making the object infinitely long.

Setting the invalid bit i causes all memory references using the address register to fault. The relocatable bit r indicates that the address refers to an object that may be moved. This bit allows a post-heap compaction invalidation of only the relocatable addresses, leaving the locked-down physical addresses intact.

Address register A0 is used as the base register for instruction fetching; thus, it should point to the method currently executing. If, however, the A0 absolute bit a in the IP is set, all reads, instruction fetches, and writes through register A0 ignore the value of register A0 and instead access absolute memory with an implicit base of 0 and unlimited length. This mode only affects memory accesses through register A0; the value of A0 can still be read and written normally. Address registers are read and written as ADDR-tagged values.

The four ID registers, ID0-ID3, exist to hold the IDs of relocatable objects in memory. In normal practice, ID register n should hold the ID of the object pointed by address register n. The ID is usually stored there by the XLATE instruction. When a fault occurs, the address register may be invalidated. Later, after the fault code returns, an access through the address register will cause a INVADR fault. The fault handler can then use the ID in ID register n to determine the new location of the object and the new value to be stored in the address register.

The instruction pointer register IP contains the offset within the object pointed by A0 (or the absolute offset from the base of memory if A0 absolute mode is active) to the instruction currently executing. Bit 9, the phase bit, specifies whether the low or the high instruction in the word is executing. The A0 absolute bit, bit 8, when set, causes all memory references (read and write, data and instruction fetches) through register A0 to ignore the value of A0. This effectively allows absolute addressing of memory with an implicit base of 0 and an unbounded length. The value of A0 may still be read and written normally. Bit 31, the unchecked mode bit, is a copy of the unchecked mode flag in the status register. Changing it by changing the IP register changes it in the status register also and vice versa. Likewise, bit 30, the fault bit, is a copy of the fault flag in the status register. IP is read and written as an IP-tagged value.

The stack pointer registers SP, that exist for each priority, contain the offset into the appropriate priority's stack where the next word will be PUSHed. The SP registers can vary from 0 to 31, and are used by the PUSH and POP instructions, faults, and READR and WRITER. The purpose of these stack operations is to provide short-term temporary storage for use in low-level system routines.

The trapped instruction register TRP contains the instruction that caused a fault while the fault handler is executing or NIL if the fault was not related to the execution of a specific instruction (i.e., an instruction fetch faulted, a bad message header arrived, a queue overflowed, etc.). It reads as either an INST-tagged value or NIL. Note that when TRP is non-NIL, the instruction is always given in the low 17 bits of TRP, even if it was fetched from the high 17 bits of a word in the execution stream.

The queue base/mask register QBM contains the base and mask of the input message queue. The base is the first memory location used by the queue. The mask must be of the form $2^x - 1$, with $x \geq 2$. The size allocated to the queue is equal to the mask plus 1. There is one more restriction: base AND mask=0 must hold. This effectively means that the base must be a multiple of the size of the queue, and this size must be a power of 2. As discussed below, these conditions allow queue access and wraparound to work by simply ANDing the offset within the queue with the mask and then ORing with the base. The disable bit 30 should normally be zero. Setting it disables message reception at the priority level of the QBM register, which may cause messages to be backed up in the network. This should be done only under very special circumstances, such as when the queues are being moved. The QBM register is read and written as an ADDR-tagged value.

The queue head/length register QHL contains two fields, head and length, that describe the current dynamic state of the queue. Head is an absolute pointer (i.e. relative to the beginning of memory, not the beginning of the queue) to the first word that contains valid data in the queue, while length contains the number of valid data words in the queue. The length is zero when the queue is empty, and it is never greater than the mask. QHL is read and written as an ADDR-tagged value.

The translation base/mask register TBM is used to specify the location of the two-way set-associative lookup table used by the XLATE and ENTER instructions. The format of the TBM register is similar to that of the QBM register. Again, base is the first memory location used by the table. The mask must be of the form $2^x - 1$, with $x \geq 2$. The number of words occupied by the table is equal to the mask plus 1. As in QBM, base AND mask=0 must hold. TBM is read and written as an ADDR-tagged value.

The status register is a collection of flags that may be accessed individually using READR, WRITER, or the alias MOVE. The status register cannot be accessed as a unit. It contains these flags:

P current priority level (set: level 1; clear: level 0)
B background execution status (set: background; clear: normal (message)
I interrupt mask (set: no priority switches; clear: priority switches allowed)
F fault (set: fault mode; clear: normal mode)
U unchecked mode (set: unchecked; clear: checked)
Q A3 queue wrap flag (set: A3 wraps around queue; clear: A3 normal)

The priority and background flags specify the current priority level of execution. The highest level is priority 1, with the settings P=1, B=0. Below that is priority 0, with P=0, B=0. The lowest priority level is background, with B-1. When B=1, the P flag is ignored for the purposes of priority calculation, but it still determines the register set that is in use.

The interrupt mask flag determines whether the current process may be interrupted by a process at a higher priority level. Setting this flag disables such interrupts. Clearing this flag allows background processes to be interrupted by incoming messages at priority level 0 or 1 and level 0 processes to be interrupted by incoming messages at priority level 1.

The fault flag determines whether the occurrence of a fault would be lethal to the system. If a fault with a vector in which the F bit is set occurs while this flag is set, the processor faults CATASTROPHE instead, which should point to a special fault routine whose purpose is to clean up, if possible, and gracefully shut down the processor or the system. This flag is set when a fault occurs and cleared when the fault handler returns to the faulted program; it may, however, be altered by software as well. There is a copy of this flag in the IP register. Changing this flag changes it in the IP register and vice versa. There are two copies of the fault flag, one for each priority level.

The unchecked mode flag determines whether TYPE, CFUT, FUT, TAG8 TAG9, TAGA. TAGB. and OVERFLOW faults are taken; when this flag is set, these faults are ignored, which allows more freedom in manipulation of data but provides less type checking. There is also a copy of this flag in the IP register. Changing this flag changes it in the IP register and vice versa. As with the F flag, there are two copies of the U flag, one for each priority level.

The A3-Queue bit, when set, causes A3 to "wrap around" the appropriate priority queue. This is included to allow A3 to act transparently as a pointer to a message, whether it is still in the queue, or copied into the heap. If the message is still in the queue, then setting the Q bit will allow references through A3 to read the message sequentially, even if it wraps around the queue. If the message is copied into an object, then leaving the Q bit clear will allow normal access of the message in the object. Either way, the access of the message to which A3 points will look like any other reference through an address register. Bounds checking is still performed using the length of A3 when A3 is referenced and the Q bit is set.

The node number register NNR contains the network node number of this node. It consists of an X field and a Y field indicating the position of the node in the network grid. Its value identifies the processor on the network and is used for routing. The NNR should be initialized by software after a reset and left in that state. This register is initialized to zero on a reset. When it is zero, a message sent out of this node with a destination node number of zero will be received back at this node. The NNR is read and written as an INT-tagged value.

Context switch time is reduced by making the MDP a memory-based rather than a register-based processor so that there is a small register set. Each MDP instruction may read or write one word of memory. Because the MDP memory is on-chip, these memory references do not slow down instruction execution. Four general purpose registers are provided to allow instructions that require up to three operands to execute in a single cycle. The entire state or a context may be saved and re-stored in less than 12 clock cycles. Two register sets are provided, one for each of two priority levels, to allow low priority messages to be preempted without saving state.

The MDP controller is driven by the incoming message stream. The arrival of a message causes some action to be performed by the MDP. This action may be to read or write a memory location, execute a sequence of instructions, and/or send additional messages. The MDP controller reacts to the arrival of a message by scheduling the execution of a code sequence.

Message reception overhead is reduced to about 1μs by buffering, scheduling, and dispatching messages in hardware. The MDP maintains two message/scheduling queues (corresponding to two priority levels) in its on-chip memory. As messages arrive over the network, they are buffered in the appropriate queue. The queues are implemented as circular buffers. It is important that the queue have sufficient performance to accept words from the network at the same rate at which they arrive. Otherwise, messages would back up into the network causing congestion. To achieve the required performance, addressing hardware is used to enqueue or dequeue a message word with wraparound and full/empty check in a single clock cycle. A queue row buffer allows enqueuing to proceed using one memory cycle for each four words received. Thus a program can execute in parallel with message reception with little loss of memory bandwidth.

Figure 6:
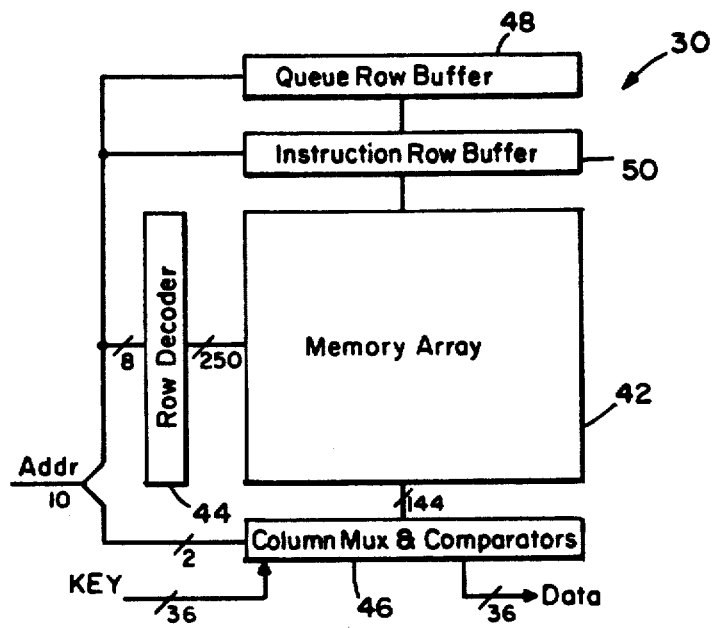
FIG. 6 is a block diagram of the memory unit of FIG. 2.

A block diagram of the MDP memory 30 is shown in FIG. 6. The memory system comprises a memory array 42, a row decoder 44, a column multiplexer and comparators 46, an instruction row buffer 50 for instruction fetch and a queue row buffer 48 for queue access. Word sizes in this figure are for a prototype which has only 1K words of RWM.

In the prototype, the memory array is a 256-row by 144-column array of 3-transistor DRAM cells. In an industrial version of the chip, a 4K word memory using 1-transistor cells would be feasible. It is preferred to provide simultaneous memory access for data operations, instruction fetches, and queue inserts; but to achieve high memory density, the basic memory cell could not be altered. Making a dual port memory would double the area of the basic cell. Instead, two row buffers are provided to cache one memory row (4 words) each. One buffer 50 is used to hold the row from which instructions are being fetched. The other buffer 48 holds the row in which message words are being enqueued.

Figure 7:
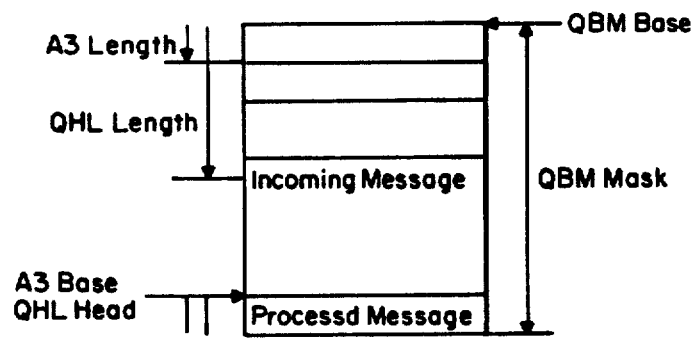
FIG. 7 is an illustration of messages located in a memory queue of FIG. 3.

Each message queue is defined by two registers: QBM, the queue base/mask register, and QHL, the queue head/length register. The queue base/mask register defines the absolute position and length of the queue in memory. In order to simplify the hardware, the length must be a power of 2, and the queue must start at an address that is a multiple of the length. The queue head/length register specifies which portion of the queue contains messages that have been queued but not processed yet. To avoid having to copy memory, the queue wraps around; if a twenty-word message has arrived and only eight words are left until the end of the queue, the first eight words of the message are stored until the end of the queue, and the next twelve are stored at the beginning. The queue head/length register contains the head and length of the queue instead of the head and tail to simplify the bounds-checking hardware involved in checking user program references to the queue. FIG. 7 is a diagram of a queue with one message being processed, two more waiting, and a third one arriving.

Figure 8:
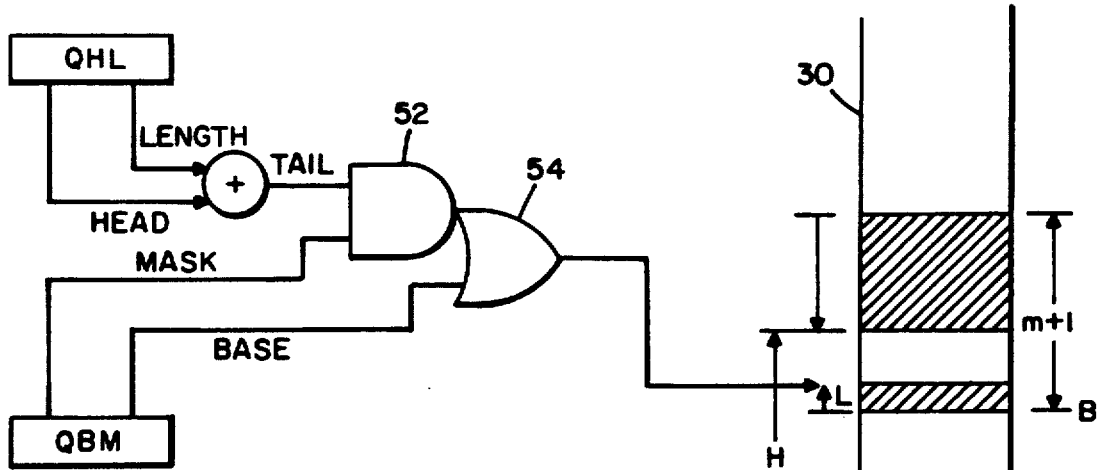
FIG. 8 is a schematic illustration of logic circuitry which addresses the memory queue.

A portion of the AAU, which is a very simple circuit illustrated in FIG. 8, provides the address of the next incoming word of a message with wraparound in a predefined queue memory space of the memory 30. In FIG. 8, the queue wraps from a header address defined by the value H through the valid queue length L as indicated by the shaded region. The segment of length M+1 set aside for the queue is a value $2^x$, and the base of the queue B has a value $k2^x$. The following is a simple numeric example using 6-bit addresses:

| | |
|---|---|
| $2^x$ = 001000 | x = 3 |
| M = 000111 | |
| B = 010000 | k = 2 |
| H + L = 001110 | |

The tail address without wraparound is obtained by summing the head and length value from the QHL register. It can be seen that by applying the tail with the mask to an AND gate 52, the higher bits of the H+L value are ignored. Those bits are then replaced by the higher bits of the base value from the QBM register through OR gate 54. Thus, the mask value selects, as the address with wraparound, the upper bits from the base value and the lower bits from the address without wraparound. Thus, the H+L value serves as on offset from the base not to exceed the length of the queue determined by the mask.

The MDP schedules the task associated with each queued message. At any point in time, the MDP is executing the task associated with the first message in the highest priority non-empty queue. If both queues are empty, the MDP is idle—viz., executing a background task. Sending a message implicitly schedules a task on the destination node. The task will be run when it reaches the head of the queue. This simple two-priority scheduling mechanism removes the overhead associated with a software scheduler. More sophisticated scheduling policies may be implemented on top of this substrate The head value in the QHL register is a pointer to the header word of the next message in the queue. The processor examines the header of the message and dispatches control to an instruction sequence beginning at the physical address taken from the <opcode> field of the message. This mechanism is used directly to process messages requiring low latency (e.g., combining and forwarding). Other messages (e.g., remote procedure call) specify by the physical address a handler that locates the required method (using the translation mechanism described below) and then transfers control to the method. The processor hardware also places in register A3 the memory segment in which the next message is located. The base of A3 is taken from the head of the QHL register and the length is taken from the header word of the message. Message arguments are read under program control from the memory segment identified by the A3 register.

In the MDP, all messages do result in the execution of instructions. A key difference over prior systems is that no instructions are required to receive or buffer the message, and very few instructions are required to locate the code to be executed in response to the message. The MDP provides efficient mechanisms to buffer messages in memory, to synchronize program execution with message arrival, and to transfer control rapidly in response to a message. By performing these functions in hardware (not microcode), their overhead is reduced to a few clock cycles <500 ns.

The MDP uses a small ROM to hold the handler code required to execute the message types listed below. The ROM code uses the macro instruction set and lies in the same address space as the RWM, so it is very easy for the user to redefine these messages simply by specifying a different start address in the header of the message. All processors use the same physical address for the initial handler routine of these messages so each processor is able to initiate its own control thread directly from the message. The message types are as follows:

| | |
|---|---|
| READ | <base> <limit> <reply-node> <reply-sel> |
| WRITE | <base> <limit> <data> ... <data> |
| READ-FIELD | <obj-id> <index> <reply-id> <reply-sel> |
| WRITE-FIELD | <obj-id> <index> <data> |

-continued

| | |
|---|---|
| DEREFERENCE | \<oid\> \<reply-id\> \<reply-sel\> |
| NEW | \<size\> \<data\> ... \<data\> \<reply-id\> \<reply-sel\> |
| CALL | \<method-id\> \<arg\> ... \<arg\> |
| SEND | \<receiver-id\> \<selector\> \<arg\> ... \<arg\> |
| REPLY | \<context-id\> \<index\> \<data\> |
| FORWARD | \<control\> \<data\> ... \<data\> |
| COMBINE | \<obj-id\> \<arg\> ... \<arg\> \<reply-id\> \<reply-sel\> |
| CC | \<obj-id\> \<mark\> |

The READ, WRITE. READ-FIELD, WRITE-FIELD, DEREFERENCE, and NEW messages are used to read or write memory locations. READ and WRITE read and write blocks of physical memory. They deal only with physical memory address, \<base\> \<limit\>, and physical node addresses, \<reply-node\>. The READ-FIELD and WRITE-FIELD read and write a field of a named object. These messages use logical addresses (object identifiers), \<obj-id\>, \<reply-id\>, and will work even if their target is relocated to another memory address, or another node. The DEREFERENCE method reads the entire contents of an object. NEW creates a new object with the specified contents (optional) and returns an identifier. The \<reply-sel\> (reply-selector) field of the read messages specifies the selector to be used in the reply message.

The CALL and SEND messages cause a method to be executed. The method is specified directly in the CALL message, \<method-id\>. In the SEND message, the method is determined at run-time depending on the class of the receiver. The REPLY, FORWARD, COMBINE, and GC messages are used to implement futures, message multicast, fetch-and-op combining, and garbage collection, respectively.

Figure 9:
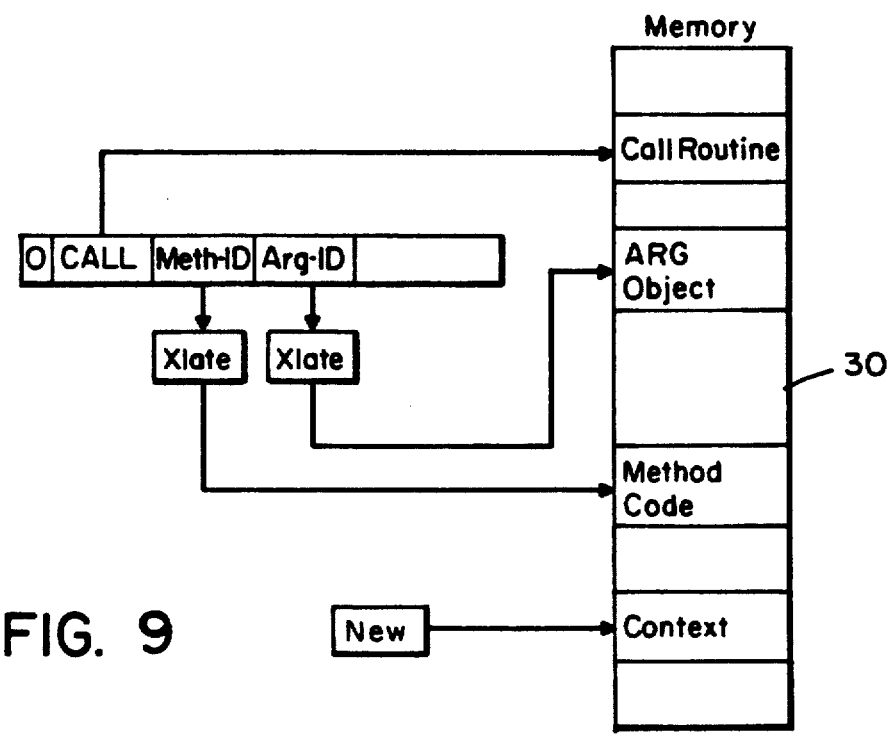
FIG. 9 is an illustration of a call message and its association with the memory of FIG. 3.

The execution sequence for a CALL message is shown in FIG. 9. The header word of the message contains the priority level (0), the physical address of the CALL subroutine in a handler portion of memory, and the length of the message. The segment of memory in which the buffered message may be found is set in the A3 register from the current head value in the QHL register and the length of the message from the message header word.

The first instruction of the call routine is fetched from the handler. The call routine selected from the handler then reads the object identifier, which serves as a virtual address for the method, and translates the identifier into a physical address in a single clock cycle using the translation table in memory to be described below. If the translation misses, or if the method is not resident in memory, a trap routine performs the translation or fetches the method from a global data structure.

Once the method code is found, the CALL routine jumps to this code. The method code may then read in arguments from the message queue identified by the A3 register. If the method faults, the message is copied from the queue to the heap. Register A3 is set to point to the message in the heap when the code is resumed. The argument object identifiers are translated to physical memory base/limit pairs using the XLATE instruction. If the method needs space to store local state, it may create a context object. When the method has finished execution, or when it needs to wait for a reply, it executes a SUSPEND instruction which deletes the current message and passes control to the next message.

Figure 10:
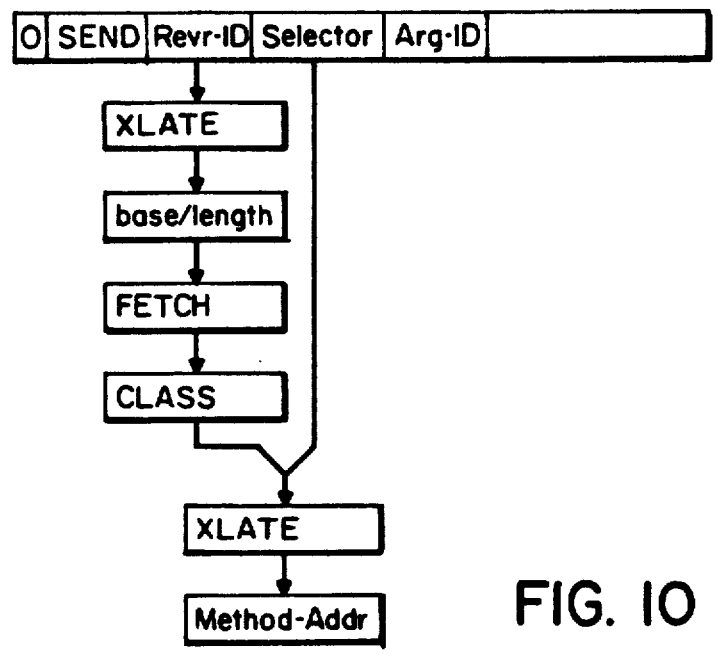
FIG. 10 is an illustration of a SEND message and a routine for locating a method from that message.

A SEND message looks up its method based on a selector in the message and the class of the receiver. Class indicates the type of data representation, such as a vector, string or polynominal. The selector indicates the generic function to be performed. There may be different method routines for performing a given function with respect to different classes of data; thus, the two indications together determine the method to be used. This method lookup is shown in FIG. 10. The receiver identifier is translated into a base/length pair. Using this address, the class of the receiver is fetched. The class is concatenated with the selector field of the message to form a key that is used to look up the physical address of the method in the translation table. Once the method is found, processing proceeds as with the CALL message.

The MDP brings together shared-memory and message-passing parallel computers. Shared-memory machines provide a uniform global name space (address space) that allows processing elements to access data regardless of its location. Message-passing machines perform communication and synchronization via node-to-node messages. These two concepts are not mutually exclusive. The MDP provides a virtual addressing mechanism intended to support a global name space while using an execution mechanism based on message passing.

The MDP provides many of the advantages of both message-passing multicomputers and shared-memory multiprocessors. Like a shared-memory machine, it provides a single global name space, and needs to keep only a single copy of the application and operating system code. Like a message-passing machine, the MDP exploits locality in object placement, uses messages to trigger events, and gains efficiency by sending a single message through the network instead of sending multiple words. While an object-oriented programming system is implemented on the MDP, the MDP may also be an emulator that can be used to experiment with other programming models.

An MDP word is 36 bits: a 4-bit tag and a 32-bit datum. Tags are used both to support dynamically typed programming languages and to support concurrent programming constructs such as relocatable objects and futures.

Tags are an integral part of the addressing mechanism. An ID may translate into an address descriptor for a local object, or a node address for a global object. The tag allows us to distinguish these two cases to be distinguished, and a fault provides an efficient mechanism for the test. Tags also allow an ID key to be distinguished from a class/selector key with the same bit pattern.

When the translator is used to determine a physical address from an object identifier, the tag of the located data may indicate a local location, in which case the address is the physical address in the local processor. Alternatively, the tag may indicate that the recovered address is that of a remote node in which the object may reside. In that case, the local processor would likely request the object from the remote processor. A remote node address may be the result of some prior routine processed in the local processor which provides a hint of the object location. If such an indication of the location of the object is not otherwise available, the hometown node of the object can be determined from a field of the object ID. Each node in the array is responsible for tracking the location of its hometown objects.

As an example of the use of tags with futures, consider the case where an object A sends a message to an object B instructing B to perform some computation and then to return the result in a reply message to update A's local variable x. To synchronize with the reply, A first tags x as a C-FUT (for context future) then sends the message and proceeds without waiting for a reply. If the reply arrives before A uses x, the tag is reset and execution simply continues. An attempt to use x before the reply, however, results in a trap that suspends execution until the reply arrives and the C-FUT tag is removed.

Each MDP instruction is 17 bits in length. Two instructions are packed into each MDP word (the INST tag is abbreviated). Each instruction may specify at most one memory access. Registers or constants supply all other operands.

Figure 11:
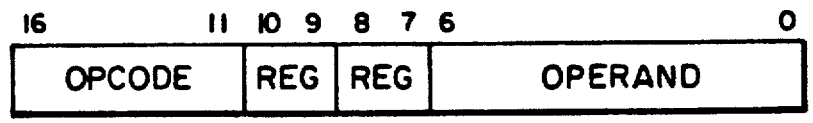
FIG. 11 is an illustration of the instruction format for use in the processor of FIG. 2.

As shown in FIG. 11, each instruction contains a 6-bit opcode field, two 2-bit register select fields and a 7-bit operand descriptor field. The operand descriptor can be used to specify: (1) a memory location using an offset (short integer or register) from an address register, (2) a short integer or bit-field constant, (3) access to the message port, or (4) access to any of the processor registers.

In addition to the usual data movement, arithmetic, logical, and control instructions, the MDP provides machine instructions to:

Read, write, and check tag fields
Look up the data associated with a key using the TBM register and set-associative features of the memory (XLATE).
Enter a key/data pair in the association table (ENTER).
Transmit a message word (SEND, SENDE).
Suspend execution of a method (SUSPEND).

The translation mechanism is exposed to the programmer with the ENTER and XLATE instructions. ENTER Ra, Rb associates the contents of Ra (the key) with the contents of Rb (the data). The association is made on the full 36 bits of the key so that tags may be used to distinguish different keys. XLATE Ra, Ab looks up the data associated with the contents of Ra and stores this data in Ab. The instruction faults if the lookup misses or if the data is not an address descriptor. XLATE Ra, Rb can be used to look up other types of data. This mechanism is used by the system code to cache ID to address descriptor (virtual to physical) translations, to cache ID to node number (virtual to physical) translations, and to cache class/selector to address descriptor (method lookup) translations.

Most computers provide a set-associative cache to accelerate translations. This mechanism has been taken and exposed in a pair of instructions that a systems programmer can use for any translation. Providing this general mechanism provides the freedom to experiment with different address translation mechanisms and different uses of translation. Very little is paid for this flexibility since performance is limited by the number of memory accesses that must be performed.

Figure 12:
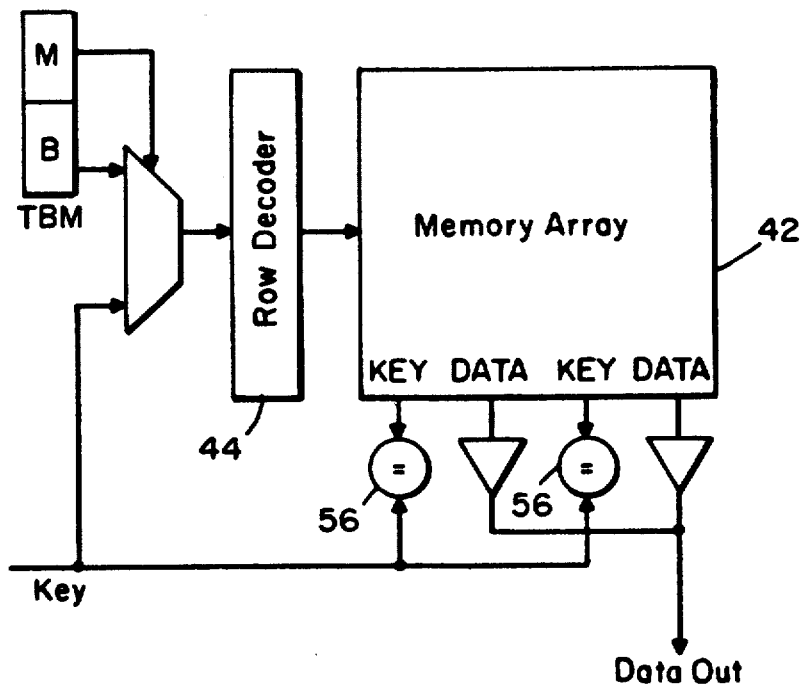
FIG. 12 is a block diagram of the memory of FIG. 2 and logic of the AAU of FIG. 4 utilized in a set-associative memory access.

The MDP memory 30 is used both for normal read/write operations, and as a set-associative cache to translate object identifiers into physical addresses and to perform method lookup. These translation operations are performed as shown in FIG. 12. The TBM register contains a 14-bit base and a 14-bit mask. Each bit of the the mask (MASK) selects between a bit of the association key (KEY) and a bit of the base (BASE) to generate the corresponding address bit ADDR. The high order ten bits of the resulting address are used to select the memory row in which the key might be found. The TBM register selects the range of memory rows that contain the translation table. The key being translated selects a particular row within this range. This selector is in fact the identical AND/OR logic circuit used for queue wraparound and illustrated in FIG. 8 with a different set of inputs multiplexed to the circuit. In the case of the translator successive segments of key addresses are wrapped into the single translator each segment of memory as the hash function.

Comparators 56 (FIG. 12) built into the column multiplexer 46 (FIG. 6) compare the key with each odd word in the row. If a comparator indicates a match, it enables the adjacent even word onto the data bus. If no comparator matches the data a miss is signaled, and the processor takes a trap where the translation is performed in software. For clarity, FIG. 12 shows the words brought out separately. In fact, to simplify multiplexer layout, the words in a row are bit interleaved.

In the event that a translation misses in the cache, the instruction is processed by a software lookup.

The MDP injects messages into the network using a send instruction (not to be confused with the SEND message and associated handler routine). The send instruction transmits one or two words (at most one from memory) and optionally terminates the message. The first word of the message is interpreted by the network as an absolute node address (in x, y format) and is stripped off before delivery. The remainder of the message is transmitted without modification. A typical message send to send a four-word message is as follows:

| SEND | R0; send net address |
|---|---|
| SEND2 | R1, R2; header and receiver |
| SEND2E | R3, [3,A3]; selector and continuation - end msg. |

The first instruction sends the absolute address of the destination node (contained in R0). The second instruction sends two words of data (from R1 and R2). The final instruction sends two additional words of data, one from R3, and one from memory. The use of the SENDE instruction marks the end of the message and causes it to be transmitted into the network. In a Concurrent Smalltalk message, the first word is a message header, the second specifies the receiver, the third word is the selector, subsequent words contain arguments, and the final word is a continuation.

The network interface 24 includes a first-in-first-out (FIFO) buffer which receives, with each SEND instruction, the words to be transmitted with each SEND instruction. Unless the buffer becomes full, all words of the message are retained until the SENDE instruction. At that time, the full message is transmitted promptly at a rate matched to the network. If the buffer becomes full before the SENDE instruction is received the data stored in the FIFO is promptly transferred into the network as the local processor continues to write additional data into the FIFO with successive SEND instructions.

It is important that, once a transfer into the network begins, the processor not be interrupted to process some other routine of higher priority. That other routine might require a response from the message in order to proceed and could cause a deadlock. Therefore, once transfer begins, the processor is locked to continue executing the SEND instructions until a SENDE instruction is processed.

The SUSPEND instruction terminates the processing of the message. First it flushes one message from the proper input queue. To that end, the head value of the QHL register is incremented, and the length value is decremented by the length value in the A3 register. The head value is determined through the queue wraparound logic of FIG. 8. Then the SUSPEND instruction clears the F, I and P bits of the status register and sets the B bit. Finally, the SP is set to zero, flushing the stack. If a message is ready, it is executed as described above. Otherwise, the IP is fetched from the background exception vector and execution resumes with the next instruction of background code. If SUSPEND is executed in background mode, it behaves as above except that it doesn't try to flush a message. Because SUSPEND tries to flush a message, it is crucial that every message arrival correspond to exactly one SUSPEND. An MDP routine that gets executed by a message should terminate with one and only one SUSPEND.

While this invention has been particularly shown and described with references to a preferred embodiment thereof, it will be understood by those skilled in the art that various changes in form and details may be made therein without departing from the spirit and scope of the invention as defined by the appended claims.

What is claimed is:

1. In a concurrent computer system in which an array of processors is coupled in a communication network over which messages are transferred between processors of the array, the method in a processor of the array comprising:
   automatically storing sequential messages in a queue independent of any ongoing routine;
   with suspension of a routine, reading a header of a next received message from the queue, and from a physical address in the header directly addressing a first handler routine to be processed;
   processing the first handler routine and subsequent routines to which the first handler routine directs the processor, the first handler routine processing data in the message to locate a subsequent routine;
   identifying a segment of memory by creating a segment descriptor that identifies a base address and a length of the entire week received message from length data in the header; and
   reading message arguments under program control from the identified memory segment by computing an address as an offset from the base address from the segment descriptor and checking the address against a length limit.

2. In a concurrent computer system in which an array of processors is coupled in a communication network over which messages are transferred between processors of the array, the method in a processor of the array comprising:
   storing data in rows of words in memory; addressing and reading a row from memory;
   forwarding an individual word from an addressed row to a data bus;
   storing a row of words received from a communications channel which is separate from the data bus for simultaneously writing a row of words into a queue with a single access;
   automatically storing sequential messages in the queue independent of any ongoing routine;
   with suspension of a routine, reading a header of a next received message from the queue, and from a physical address in the header directly addressing a first handler routine to be processed; and
   processing the first handler routine and subsequent routines to which the first handler routine directs the processor, the first handler routine processing data in the message to locate a subsequent routine.

3. A concurrent data processing system comprising:
   a processor which processes instructions received in messages;
   a memory which stores data, accessible by the processor for processing, in rows of words;
   means for address a row from memory;
   means for forwarding an individual word from an addressed row to a data bus coupled to the processor; and
   a row buffer means coupled to the memory, in parallel with the means for forwarding, for storing a row of words of a massage to be processed by the processor, received serially from a communications channel which is separate from the data bus and independent of the processor, and for thereafter simultaneously writing a row of words from the row buffer into memory with a signal access to a row addressed by the means for addressing.

4. A concurrent data processing system comprising:
   a processor that processes instructions received in messages;
   a memory which stores data, accessible by the processor for processing, in rows of words;
   means for addressing a row from memory;
   means for forwarding an individual word from an addressed row to a data bus coupled to the processor; and
   means coupled, in parallel with the means for forwarding, for storing a row of instruction words addressed together from a row of memory to be applied in parallel with data on the data bus along a data path separate from the data bus, as instruction words to be fetched by the processor.

5. A data processing system as claimed n claim 39 further comprising row buffer means for storing a row of words received from a communication channel which is separate from the data bus and independent of the processor for simultaneously writing a row of words from the row buffer into memory with a single access to a row addressed by the means for addressing.

UNITED STATES PATENT AND TRADEMARK OFFICE
CERTIFICATE OF CORRECTION

PATENT NO. : 5,212,778

DATED : May 18, 1993

INVENTOR(S) : William J. Dally, Andrew A. Chien, Waldemar P. Horwat and Stuart Fiske It is certified that error appears in the above-identified patent and that said Letters Patent is hereby corrected as shown below:

In Claim 1, column 15, line 58, change "week" to --next--.

In Claim 3, column 16, line 29, change "address" to --addressing--, in line 35, change "massage" to --message--; and in line 40, change "signal" to --single--.

In Claim 5, column 16, line 57, change "n" to --in--.

Signed and Sealed this

First Day of March, 1994

Attest:

BRUCE LEHMAN

*Attesting Officer*     *Commissioner of Patents and Trademarks*